United States Patent [19]

FitzHenry et al.

[11] Patent Number: 5,063,607

[45] Date of Patent: Nov. 5, 1991

[54] IMAGE CONTRAST ENHANCEMENT TECHNIQUE

[75] Inventors: Patrick FitzHenry, Los Angeles; Lawrence A. Scanlan, Westchester, both of Calif.

[73] Assignee: Hughes Aircraft Company, Los Angeles, Calif.

[21] Appl. No.: 261,812

[22] Filed: Oct. 24, 1988

[51] Int. Cl.$^5$ ............................................. G06K 9/38
[52] U.S. Cl. ........................................ 382/50; 382/51; 382/52; 382/53; 358/166; 358/169
[58] Field of Search ....................... 382/50, 51, 52, 53, 382/18; 358/163, 166, 168, 169, 448, 37

[56] References Cited

U.S. PATENT DOCUMENTS

| | | | |
|---|---|---|---|
| 4,365,304 | 12/1982 | Ruhman et al. | 382/51 |
| 4,695,884 | 9/1987 | Anastassiou et al. | 382/51 |
| 4,783,828 | 11/1988 | Sadgadi | 382/51 |

*Primary Examiner*—Michael Razavi
*Attorney, Agent, or Firm*—William J. Streeter; Wanda K. Denson-Low

[57] ABSTRACT

An image contrast enhancement technique for use in a forward looking infrared system adapted to adjust the intensity of an image of a scene, the image being realized from electrical signals generated in response to radiation received from a plurality of regions within a field of view of the scene. The technique includes the step of filling a first matrix with digital entries corresponding to each electrical signal, the difference between the maximum and minimum digital entries defining a first dynamic range. The first matrix is sampled to create a set of digital entries having a second dynamic range substantially similar to the first dynamic range. A histogram of the set of digital entries is then constructed. A first transfer function is generated by at least approximating the integral of the histogram, the first transfer function having a value at each of the digital entries. The technique further includes the step of generating a second matrix having entries obtained by multiplying each of the entries of the first matrix by the value of the first transfer function at each of the entries. The image of the scene is generated by driving a display with signals derived from the entries of the second matrix.

9 Claims, 5 Drawing Sheets

FIG. 2
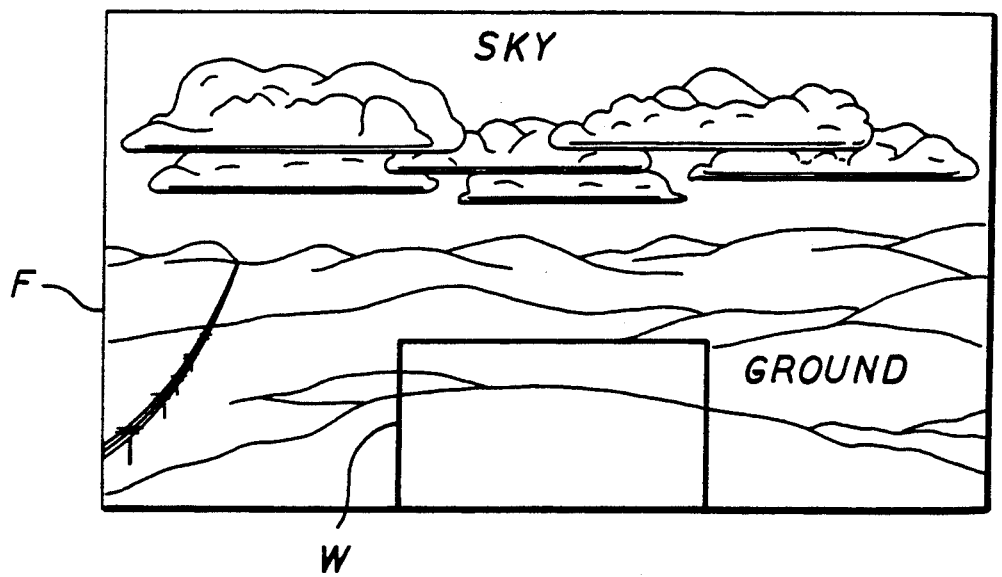
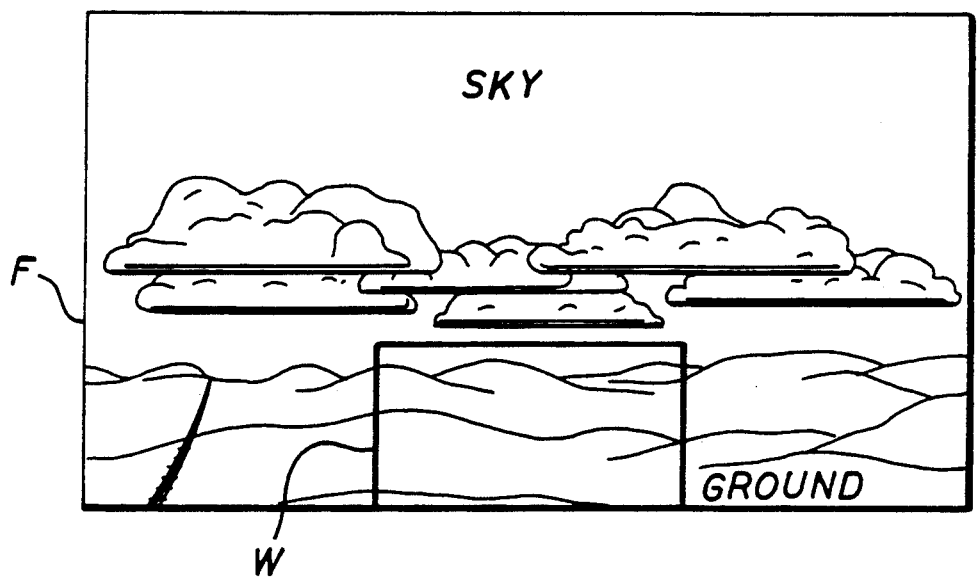
FIG. 3

IMAGE CONTRAST ENHANCEMENT TECHNIQUE

This invention was made with Government support under Contract DAAK50-84-C-0024 awarded by the Department of the Army. The Government has certain rights in this invention.

BACKGROUND OF THE INVENTION

1. Field of the Invention

The present invention relates to image processing. More specifically, the present invention relates to image enhancement through scene histogram modification.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Thermal imaging systems, such as Forward Looking Infrared (FLIR) systems, collect radiation from a scene to be imaged indicative of the temperature thereof. Infrared sensors typically convert this collected radiation to analog electrical signals which are passed through an analog to digital converter and stored in RAM memory. This digital data from the scene is processed and subsequently used to produce a static image or to feed video display driving circuitry.

The digital data from the scene is processed in order to control the intensity of the resultant static image or video display. For example, in the case of a conventional "black and white" video display the temperatures of the scene (as represented digitally in RAM) are mapped by an image processing scheme to a number of shades of gray between white and black. In some systems this mapping is linear. That is, the maximum and minimum digital RAM entries (corresponding to the maximum and minimum scene temperatures) are generally assigned to correspond to the image shades of white and black. A linear transfer function is then constructed between these temperature extremes and is used to map intermediate scene temperatures to corresponding shades of gray. Hence, in image processing utilizing linear mapping techniques the available shades of gray are allocated equally among the temperature ranges existing within the scene to be imaged.

FIG. 1a shows a histogram of the digital entries generated from thermal radiation received from a scene to be imaged. The horizontal axis of FIG. 1a corresponds to the range of digitally represented scene temperatures. The vertical axis of the histogram pertains to the number of memory locations containing a particular digital scene temperature. For example, digital scene temperature A is present in B memory locations. A linear transfer function L maps digital entries (scene temperatures) on the horizontal axis to a spectrum of the available shades of gray S. Inspection of FIG. 1a reveals that the temperatures of interest from the scene represented by the histogram of FIG. 1a are concentrated between the digital entries C and D and between the entries E and F. It follows that the shades of gray between points G and H and between points I and J were used in constructing an image of the scene. Unfortunately, as a result of the linear mapping function L the shades of gray between H and I were unused in generation of the scene image. Consequently, by allocating the available shades of gray uniformly throughout the temperature spectrum of the scene the linear mapping technique limits the image contrast obtainable within temperature ranges of interest.

FIG. 1b illustrates an image processing technique known as histogram equalization wherein the available shades of gray are allocated nonlinearly to the temperatures most prevalent within the scene to be imaged (see e.g., T. Pavlidis, *Algorithms for Graphics and Image Processing*). Specifically, the histograms of FIGS. 1a and 1b are derived from the same scene but in FIG. 1b the scene temperatures are mapped to a spectrum S' of the available shades of gray by a nonlinear mapping function N. The mapping function N is generated by integrating the histogram of FIG. 1b. As is evident upon inspection of FIG. 1b the spectrum of unused shades of gray is smaller in FIG. 1b than in FIG. 1a. Accordingly, a larger number of shades of gray are available to enhance image contrast within scene temperatures of interest by utilizing histogram equalization mapping rather than linear mapping.

Unfortunately, real-time video display systems are currently unable to directly implement histogram equalization because of computational constraints imposed by the available hardware. That is, the nonlinear mapping function N discussed above is not able to be modified quickly enough to adequately respond in real-time to a changing scene due to the large quantity of scene temperature data.

The problem of enhancing image detail (contrast) is addressed in certain imaging systems by including a relatively small "window" within the field of view of the scene. Detail within the window is to be enhanced by formulating a mapping function based exclusively on scene temperatures within this small window. For example, FIG. 2 shows the field of view F of a scene wherein a mapping function is constructed using scene temperatures from a window W included therein. The mapping function is generally constructed so as to maximize the number of shades of gray (contrast) available to the range of scene temperatures within the window W. In FIG. 2 the window W is chosen to include only the ground and not the sky so as to narrow the temperature range to which the available shades of gray are to be allocated. Further, real-time image processing is possible due to the reduced number of data points within the window W relative to the entire field of view F.

However, if as is shown in FIG. 3 the field of view F is translated such that the window W also includes a portion P of the sky, the scene temperature range from which the mapping function is constructed will again be comparable to that of the entire field of view F and little, if any, improvement in contrast will occur within the section of the resultant image corresponding to the window W. It follows that schemes to optimize contrast within a window of the field of view of a scene may be unsuitable in applications where real-time changes in the field of view can lead to a wide scene temperature differential.

Hence, a need in the art exists for a computationally efficient method, suitable for real-time applications, of controlling the intensity of an image of a scene.

SUMMARY OF THE INVENTION

The need in the art for a computationally efficient method of image intensity control is addressed by the image contrast enhancement technique of the present invention. The image contrast enhancement technique of the present invention is adapted to adjust the intensity of an image of a scene, the image being realized from electrical signals generated in response to radiation received from a plurality of regions within a field of view of the scene. The technique of the present invention includes the step of filling a first matrix with digital entries corresponding to each electrical signal, the difference between the maximum and minimum digital entries defining a first dynamic range. The first matrix is sampled to create a set of digital entries having a second dynamic range substantially similar to the first dynamic range. A histogram of the set of digital entries is then constructed. A first transfer function is generated by at least approximating the integral of the histogram, the first transfer function having a value at each of the digital entries. The technique of the present invention further includes the step of generating a second matrix having entries obtained by multiplying each of the entries of the first matrix by the value of the first transfer function at each of the entries. The image of the scene is generated by driving a display with signals derived from the entries of the second matrix.

BRIEF DESCRIPTION OF THE DRAWINGS

FIG. 2 shows the field of view of a scene to be imaged, the field of view having a window within which scene contrast is to be enhanced.

FIG. 3 is an illustrative representation of the field of view of a scene, the field of view having a window encompassing a portion of the field of view having a wide scene temperature range.

DETAILED DESCRIPTION OF THE INVENTION

Figure 1A:
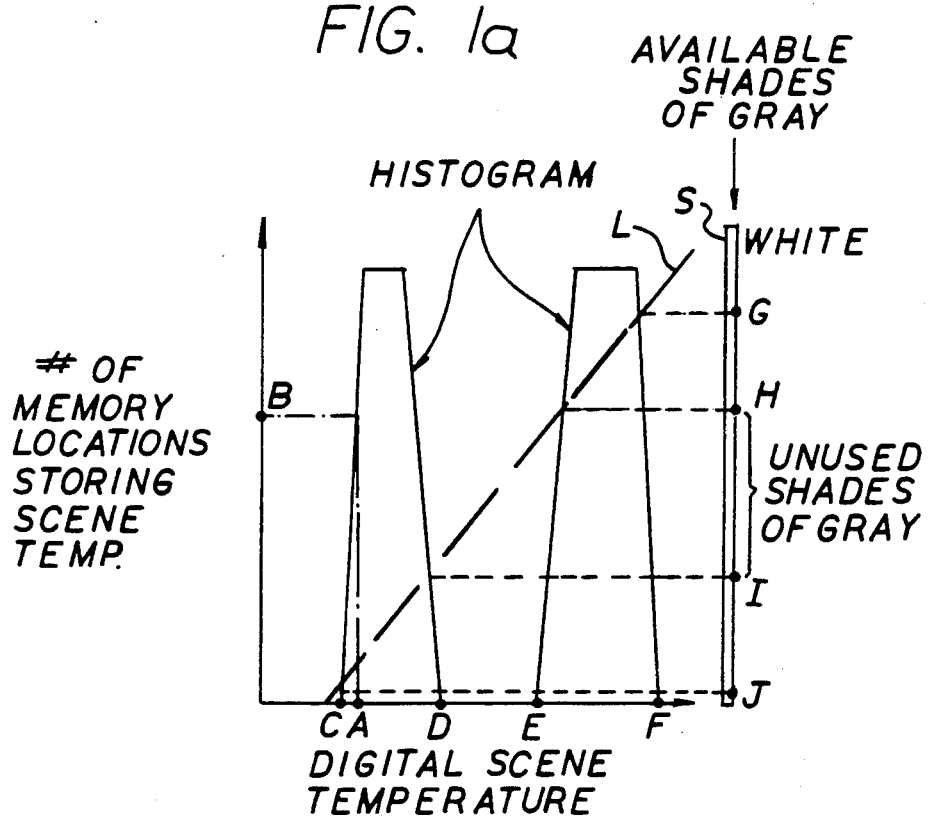
FIG. 1a shows a histogram of digital entries generated from thermal radiation received from a scene to be imaged.
Figure 1B:
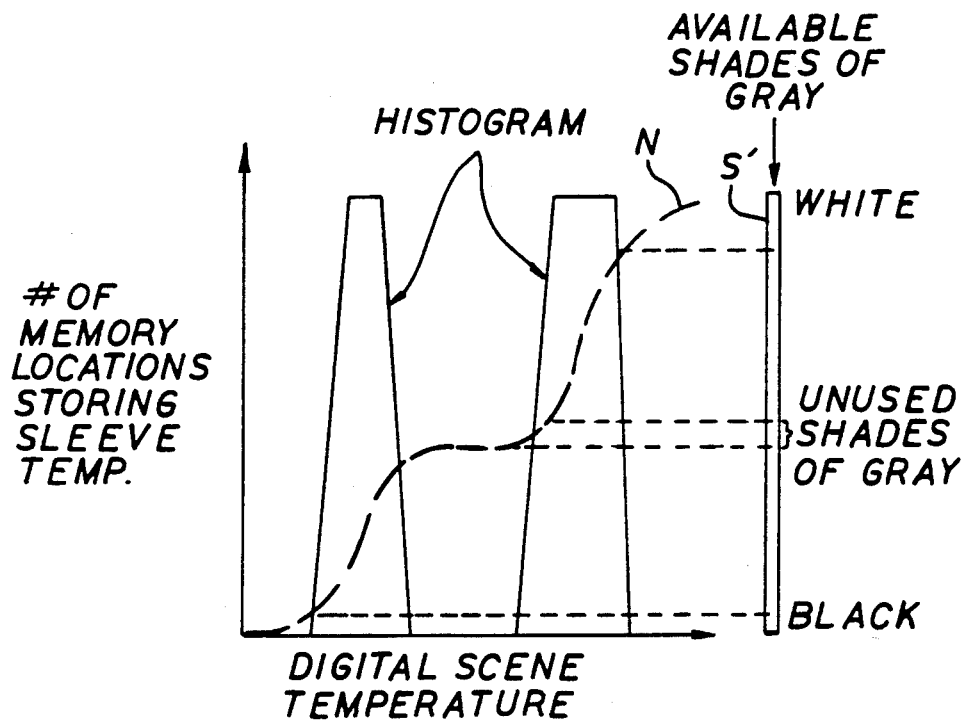
FIG. 1b illustrates the image processing technique of histogram equalization.
Figure 4:
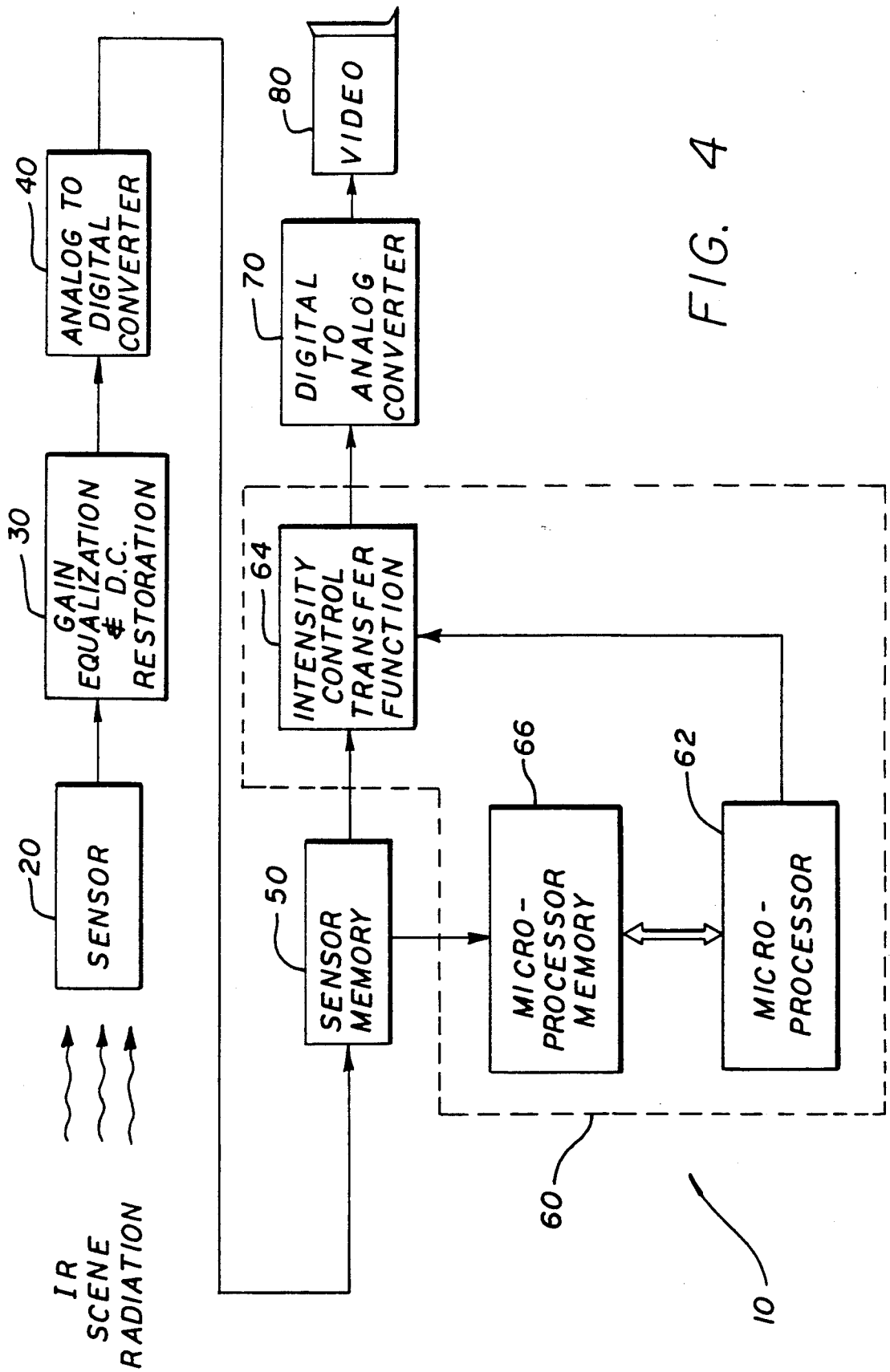
FIG. 4 is a simplified block diagram of a FLIR system in which the image contrast enhancement technique of the present invention may be employed.

FIG. 4 is a simplified block diagram of a FLIR system 10 in which the image contrast enhancement technique of the present invention may be employed. The system 10 includes a sensor 20 which collects infrared radiation from a scene to be imaged. In the embodiment of FIG. 4 the sensor 20 includes an infrared detector array mounted within a microprocessor controlled turret. The infrared detectors generate analog voltages indicative of the thermal scene within the field of view of the sensor 20. The analog scene temperature voltages are gain equalized and DC restored by an equalization/restoration module 30. Next the analog scene temperature voltages are converted to digital values with an analog to digital converter 40 and stored in sensor memory 50. The sensor memory 50 is updated at a suitably high rate (e.g. 30 Hz) to accurately reflect changes in the thermal scene. Additionally, in the embodiment of FIG. 4 sensor memory 50 includes a storage matrix typically having dimensions on the order of 320 rows by 752 columns. Each digital entry stored within the matrix corresponds to a scene temperature within a particular region of the field of view of the sensor 20.

The image contrast enhancement technique of the present invention is utilized within a video intensity control module 60 included in the system 10 to process the scene temperature data within sensor memory 50. In the embodiment of FIG. 4 a microprocessor 62, such as an Intel 8086, is included within the module 60 to assist in the implementation of the image contrast enhancement technique of the present invention. In a preferred embodiment the microprocessor 62 will be of adequate sophistication to be programmed in a high order language such as PLM 86. As is discussed below, the technique of the present invention involves formulating and storing in RAM a digital intensity control transfer function (lookup table) 64. A subset of the data within sensory memory 50 is stored within microprocessor memory 66 and operated thereupon by the microprocessor 62 to realize the digital transfer function 64. In addition, a portion of microprocessor memory 66 includes programmable read only memory in which is stored instructions for controlling the microprocessor 62. Following construction of the digital transfer function 64, scene temperature data from sensor memory 50 is passed therethrough and converted to analog voltages by an digital-to-analog converter 70. These analog voltages are updated at approximately a 5 Hz rate and are used to drive a video display 80. In this manner the image contrast enhancement technique of the present invention may be used within an imaging system 10 to effect real-time adjustment of the intensity of a video representation of a scene.

Figure 5:
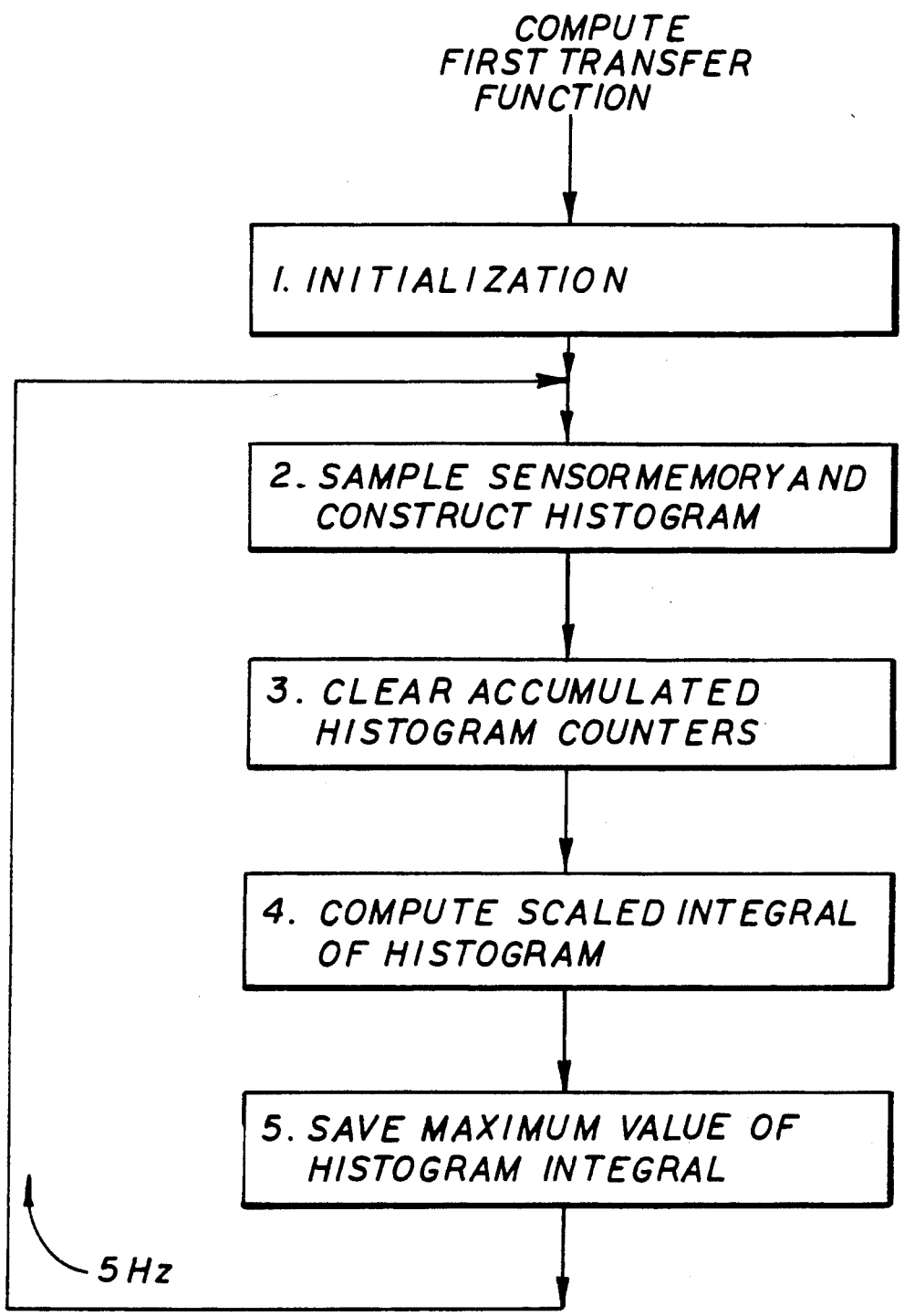
FIG. 5 is a flowchart which documents the principal steps included within the image contrast enhancement technique of the present invention.

FIG. 5 is a flowchart which documents the principal steps included within the image contrast enhancement technique of the present invention. Although the following discussion of the technique of the present invention is directed towards a computer program embodiment thereof, it is understood that the present invention is not limited to such an embodiment. The entire five step sequence shown in FIG. 5 is performed to construct a first intensity control transfer function (lookup table) 64. Steps two through five are then sequentially, repeatedly performed at approximately a 5 Hz rate to update the first intensity control function in response to modifications in the digital temperature scene data within sensor memory 50. As mentioned above, the scene data within sensor memory 50 is altered as the scene within the field of view of the sensor 20 changes. Again, data stored in sensor memory 50 is multiplied by the intensity control transfer function 64 to control the intensity of the video display 80.

The initialization step of FIG. 5, performed only while formulating the first digital intensity control transfer function, includes initializing a transfer function index to zero. The transfer function index identifies the digital entry corresponding to a particular scene temperature. A histogram index is also initially set to zero. The histogram index will be discussed with reference to the fourth step shown in FIG. 5.

The second step in the technique of the present invention flowcharted in FIG. 5 includes sampling sensor memory 50. As mentioned above, in the embodiment of FIG. 4 the sensor memory 50 contains a matrix of digital values, each value being representative of the temperature of a region of the scene to be imaged. Values from every other horizontal line within the matrix and from a selected number of columns are stored in microprocessor memory 66 and will be utilized in a forthcoming step to approximate a histogram of the digital scene temperatures stored within the memory 50. It is suggested that a minimum of one sixteenth of the values within the memory 50 be selected in the manner described above to obtain a suitably adequate sample of the temperatures of the scene to be imaged. Additionally, this sampling method tends to enhance the prospect that the dynamic range of scene temperatures stored in microprocessor memory 66 substantially mirrors that stored in sensor memory 50. Next, a histogram of the sampled set of digital scene temperatures is constructed by counting the number of occurrences of each digital scene temperature within the sampled set.

The third step shown in the flowchart of FIG. 5 is that of clearing the accumulated histogram counters. The third step of FIG. 5 differs depending on whether the first intensity control transfer function is being initially constructed or is being modified by a subsequent iteration through the flowchart of FIG. 5. Specifically, in the former case the transfer function index and the histogram index should both have been set to zero during initialization and should remain so. In the latter case these two indices are nonzero and should be reset to zero. In both cases an accumulated histogram count index should also be set to zero. The accumulated histogram count index is used in the fourth step of FIG. 5 when computing a scaled integral of the histogram constructed in step 2. In addition, within the third step shown in FIG. 5 a scale factor to be used in the fourth step of FIG. 5 is computed. Again, computation of the scale factor is dependent on whether the first or a subsequent iteration of the flowchart of FIG. 5 is presently occurring. In the former case the scale factor is defined as the quotient of the maximum acceptable value of the intensity control transfer function and the estimated maximum value of the integral of the histogram collected in step 2. In the latter case the scale factor is defined as the quotient of the maximum acceptable value of the intensity control transfer function and maximum value of the integral of the histogram saved from the previous iteration. The maximum acceptable value of the intensity control transfer function is determined by the maximum signal level accepted by the video display 80.

The fourth step within the flowchart of FIG. 5 includes calculating the intensity control transfer function from the information assembled within the first three steps. Specifically, the digital scene transfer function comprises a scaled approximation of the integral of the histogram collected in step 2. The value of the histogram is summed over the first set of histogram "bins" (i.e. the set of lowest scene temperatures) by incrementing the histogram index. This histogram sum is assigned to the accumulated histogram count index. The value of the intensity control transfer function at the highest scene temperature within the first set of bins is then computed by multiplying the accumulated histogram count index by the scale factor. Next, the value of the histogram is summed over an adjacent second set of histogram bins. This histogram sum over the second set of bins is then added to the accumulated histogram count index. Again, the value of the intensity control transfer function at the highest scene temperature (bin) within the second set of bins is computed by multiplying the present value of the accumulated histogram count index by the scale factor. Now that the intensity control transfer function has been computed at two scene temperatures, interpolation may be used to calculate the intensity control transfer function at scene temperatures therebetween. The transfer function index is incremented through the first and second sets of bins to control the pace of the interpolation process. In this manner the intensity control transfer function is formulated to approximate a scaled integral of the histogram found in step 2.

Figure 6A:
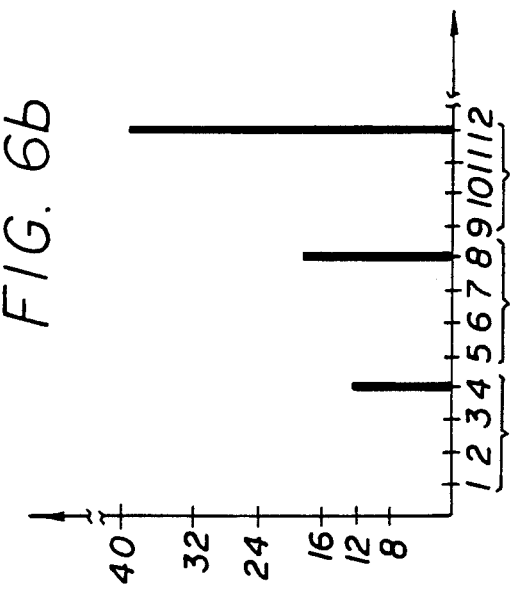
FIGS. 6a, 6b and 6c illustratively represent a method of formulating the intensity control transfer function utilized within the image contrast enhancement technique of the present invention.
Figure 6B:
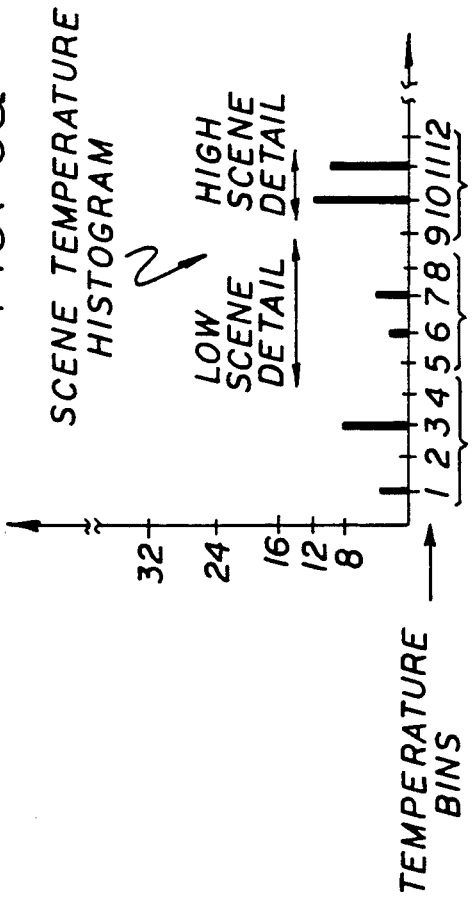
Figure 6C:
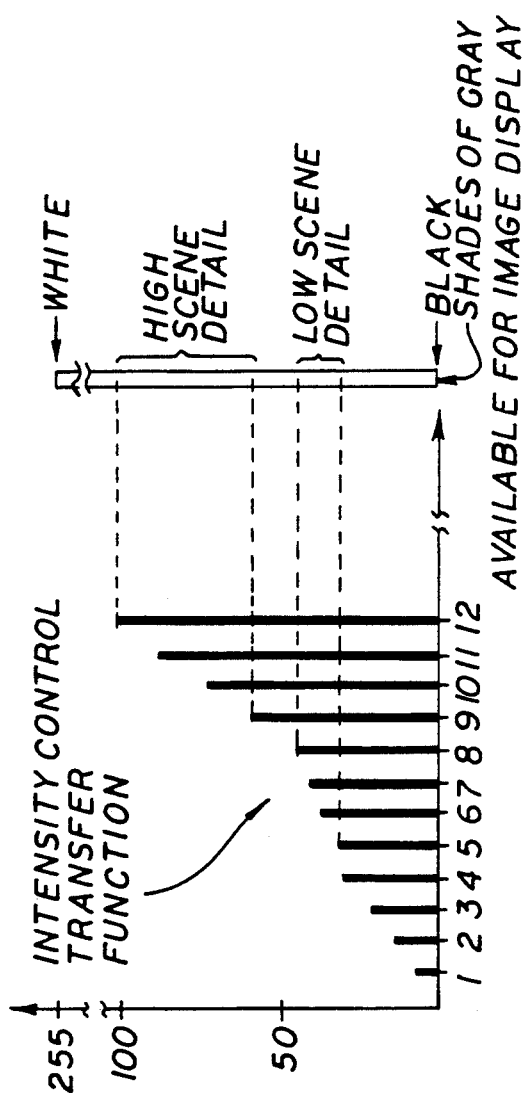

FIGS. 6a, 6b and 6c illustratively represent the method of formulating the intensity control transfer function described above with respect to the fourth step of FIG. 5. FIG. 6a shows a section of a histogram constructed on the basis of a sampled set of scene temperature data from sensor memory 50. In particular, FIG. 6a includes data from twelve successive scene temperature bins. The temperature differential between each bin is a function of the temperature range of the scene to be imaged. That is, the maximum and minimum scene temperatures to be included in the histogram of FIG. 6a may be specified during the initialization step shown in FIG. 5. Again, the value of the histogram of FIG. 6a at each temperature bin corresponds to the number of occurrences of that temperature within the sampled set of scene temperatures collected from sensor memory 50. Accordingly, it is seen there is relatively little detail in the scene to be imaged within the temperature range represented by bins four through eight. In contrast, bins nine through twelve span temperature range of relatively higher scene detail.

FIG. 6b illustrates the results of successively summing histogram bins one through four, five through eight, and nine through twelve. As discussed above, the accumulated histogram counter is updated from zero to the sum of bins one through four and the sum is assigned to bin four of FIG. 6b. The value within bin four of FIG. 6b is then multiplied by the scale factor and assigned to bin four of the intensity control transfer function shown in FIG. 6c. The values of the intensity control transfer function at bins one, two, and three are then obtained by interpolation between zero and the value present in bin four. Next the sum of bins five through eight in FIG. 6a is added to the accumulated histogram counter and the resultant sum is assigned to the eighth bin of FIG. 6b. The sum within the eighth bin of FIG. 6b is multiplied by the scale factor and assigned to the eighth bin of the intensity control transfer function. The values of the intensity control transfer function at the fifth, sixth and seventh bins are determined by interpolating between the values within the fourth and eighth bins thereof. This process continues until the intensity control transfer function has been generated for all temperature bins. It is noted that the number of bins chosen to be grouped and summed typically will affect both the computational speed of the technique of the present invention and the degree of contrast engendered within the resultant image of the scene. Accordingly, the number of bins grouped will depend on constraints imposed by particular applications.

The vertical axis of FIG. 6c is proportional to the signal levels used to drive the video display 80 of FIG. 4 and is therefore proportional to the intensity of the resultant image. As shown in FIG. 6c a higher percentage of the shades of gray available for image display are allocated to temperature ranges of high scene detail than to temperature ranges associated with low scene detail. It is therefore a feature of the technique of the present invention to enhance the contrast of relatively high detail regions of a scene image in a computationally efficient manner.

The fifth step included within the flowchart of FIG. 5 is that of storing the maximum value of the (unscaled) histogram integral. Specifically, this step is accomplished by storing the final value of the histogram count index. As mentioned above, this value is subsequently used in the following iteration during step 3 to compute the scale factor. It is implicitly assumed that the maximum value of the histogram count index will not vary substantially between successive iterations through the flowchart of FIG. 5. This assumption is warranted if steps two through five in FIG. 5 are repeated at a suitably high rate (e.g. 5 Hz) such that the overall temperature of the scene within the field of view of the sensor 20 in FIG. 4 does not significantly vary between iterations. In this manner the scale factor may be computed before the histogram integral of the present iteration is completed. It follows that computational speed is enhanced by not having to "wait" for calculation of the scale factor based on the present histogram prior to constructing the intensity control transfer function.

Although an object of the technique of the present invention is often to sharpen the contrast of detailed regions of an image of a scene, in certain instances it may be desired to "soften" the contrast of the image. In such instances the integration of the histogram described above with respect to step four of FIG. 5 may be appropriately modified. Referring to FIG. 6c it is seen that the sections of temperature bins having the highest contrast (i.e. the sets of bins allocated the greatest percentages of the available shades of gray) correspond to the bin sections in FIG. 6a having the relatively largest histogram values. Accordingly, if the percentage difference in the value of the histogram between the temperature bins in FIG. 6a is reduced, a corresponding reduction will occur in the contrast exhibited by the resultant video image. This reduction in the percentage variation of the histogram in FIG. 6a may be effected by adding a "bin bias" constant to each temperature bin within FIG. 6a. Obviously, to retain computational efficiency the bin bias constant may be incorporated while integrating the histogram of FIG. 6a and need not be added directly to the histogram of FIG. 6a. Hence, the technique of the present invention may be modified to introduce relatively less contrast into the image of a scene.

Although in general it is desired to map cold scene temperatures to dark shades of gray and warmer scene temperatures to relatively lighter shades of gray, in some applications the converse may be required. In the case of FIG. 6c, to effect such a converse mapping the intensity control transfer function thereof needs to be appropriately modified. In particular, the image contrast enhancement technique of the present invention may be easily altered to provide a "black=hot" transfer function by integrating the histogram of FIG. 6a in reverse. That is, integration will occur as described above with the exception that the histogram of FIG. 6a will first be integrated over the largest temperature bins and proceed from right to left instead of from left to right. In this manner image contrast is preserved within regions of high scene detail following an image polarity inversion without the necessity of external operator adjustment—a potentially significant feature in real-time applications.

Thus the present invention has been described with reference to a particular embodiment in connection with a particular application. Those having ordinary skill in the art and access to the teachings of the present invention will recognize additional modifications and applications within the scope thereof. For example, the image contrast enhancement technique of the present invention may be utilized in imaging systems other than FLIR real-time video systems. Those skilled in the art may be aware of other real-time or static imaging systems which would benefit from the computationally efficient technique of the present invention. Similarly, sampling schemes other than that disclosed herein may be employed to collect a histogram from the digital scene temperature data stored within sensor memory without departing from the scope of the present invention. Additionally, variations on the technique described herein for approximating the histogram integral may be used without departing from the scope of the present invention.

It is therefore contemplated by the appended claims to cover any and all such modifications.

Accordingly,

What is claimed is:

1. An image contrast enhancement technique for adjusting the intensity of an image of a scene, said image being realized from electrical signals generated in response to radiation received from a plurality of regions within a field of view of said scene, comprising the steps of:
    a) filling a first matrix with a plurality of digital entries corresponding to each of said electrical signals, said plurality of digital entries having a maximum and a minimum value with the difference between the maximum and minimum digital entries defining a first dynamic range;
    b) sampling said first matrix to create a first sample set of said plurality of digital entries, said sample set having a second dynamic range substantially similar to said first dynamic range;
    c) constructing a histogram of said first sample set of digital entries;
    d) at least approximating the integral of said histogram to generate a first transfer function, said first transfer function having a value at each of said plurality of digital entries of said first matrix;
    e) generating a second matrix having a plurality of digital entries obtained by multiplying each of said plurality of digital entries of said first matrix by the value of said first transfer function at each of said entries; and
    f) generating said image by driving a display with signals derived from said plurality of digital entries of said second matrix.

2. The technique of claim 1 further including the step of scaling said first transfer function.

3. The technique of claim 1 wherein said step of sampling said first matrix includes the step of collecting said entries from alternate rows of said first matrix.

4. The technique of claim 3 wherein said step of sampling said first matrix further includes the step of collecting said entries from every Nth column of said first matrix, where the number of said columns is evenly divisible by N.

5. The technique of claim 1 wherein said step of at least approximately integrating said histogram further includes the step of adding a bin bias constant to each of said plurality of digital entries to reduce the contrast of said image.

6. The technique of claim 1 wherein said step of at least approximately integrating said histogram further includes the steps of:
   a) summing the values of said histogram from a first sequential subset of said first sample set of digital entries to accumulate a first sum and assigning said first sum to be the value of said approximated integral at the largest digital entry within said first subset;
   b) summing the values of said histogram from a second sequential subset of said first sample set of digital entries to accumulate a second sum, said second subset being adjacent to said first subset on an axis of said histogram, and temporarily assigning said second sum to be the value of said approximated integral at the largest digital entry within said second subset;
   c) summing said first and second sums to form a third sum;
   d) assigning said third sum to be the value of said approximated integral at the largest digital entry within said second subset; and
   e) approximating the value of said histogram integral over said second subset by interpolating between said first and third sums.

7. The technique of claim 1 further including the steps of:
   a) storing the maximum value of said first transfer function;
   b) updating said first matrix with a plurality of digital entries from a second scene to be imaged;
   c) sampling said updated first matrix to create a second sample set of said digital entries;
   d) constructing a second histogram of said second sample set of digital entries;
   e) at least approximately integrating said second histogram to generate a second transfer function, said second transfer function having a value at each entry from said second scene;
   f) updating said second matrix by multiplying each of the entries of said updated first matrix by both the value of said second transfer function at each of said entries of said updated first matrix and by a scale factor proportional to the quotient of the maximum signal value accepted by said display and said stored maximum value of said first transfer function; and
   h) updating said image by driving said display with said updated second matrix.

8. The technique of claim 1 wherein said step of at least approximately integrating said histogram is performed by integrating over the largest to the smallest of said plurality of digital entries.

9. An image contrast enhancement technique for adjusting the intensity of an image of a scene, said image being realized from electrical signals generated in response to radiation received from a plurality of regions within a field of view of said scene, comprising the steps of:
   a) filling a first matrix with a first plurality of digital entries corresponding to each of said electrical signals, said first plurality of digital entries being sampled and having a maximum and a minimum value with the difference between the maximum and minimum digital entries defining a first dynamic range over said field of view of said scene;
   b) refilling said first matrix with a second plurality of digital entries from said scene and resampling said first matrix to create a sample set of digital entries from said second plurality of digital entries, said sample set having a second dynamic range substantially similar to said first dynamic range;
   c) constructing a histogram of said sample set of digital entries;
   d) at least approximating the integral of said histogram to generate a first transfer function, said first transfer function having a value at each of said second plurality of digital entries of said first matrix;
   e) generating a second matrix having a third plurality of digital entries obtained by multiplying each of said second plurality of digital entries of said first matrix by the value of said first transfer function at each of said second plurality of digital entries; and
   f) generating said image by driving a display with signals derived from said third plurality of digital entries of said second matrix.

* * * * *

UNITED STATES PATENT AND TRADEMARK OFFICE
CERTIFICATE OF CORRECTION

PATENT NO. : 5,063,607

DATED : November 5, 1991

INVENTOR(S) : PATRICK FITZHENRY and LAWRENCE A. SCANLAN

It is certified that error appears in the above-identified patent and that said Letters Patent is hereby corrected as shown below:

Column 6, line 31, after "seen" insert --that--.

Signed and Sealed this

Twenty-seventh Day of April, 1993

Attest:

MICHAEL K. KIRK

*Attesting Officer*　　　　*Acting Commissioner of Patents and Trademarks*